United States Patent
Hull et al.

[19]

[11] Patent Number: 5,806,870

[45] Date of Patent: Sep. 15, 1998

[54] UTILITY VEHICLE HAVING TWO PIVOTABLE CHASSIS

[76] Inventors: Harold L. Hull, Sparks, Nev.; Allen J. Bollet, 835 El Cortez, Sparks, Nev. 89434; Michael David Olinger, 11105 N. Forker, Spokane, Wash. 99207; Cathy D. Santa Cruz, 401 Canyon Way, #43, Sparks, Nev. 89434, trustee of said Harold L. Hull, deceased

[21] Appl. No.: 596,591

[22] Filed: Feb. 5, 1996

[51] Int. Cl.⁶ ...................................................... B60D 1/24
[52] U.S. Cl. ............................................................. 280/400
[58] Field of Search ..................................... 280/400, 403, 280/430, 414, 492, 507; 180/9.4, 9.44, 9.46

[56] References Cited

U.S. PATENT DOCUMENTS

| | | | |
|---|---|---|---|
| 1,234,788 | 7/1917 | Milner | 280/400 |
| 1,986,926 | 1/1935 | Fontaine | 280/400 |
| 2,366,166 | 1/1945 | Willock | 280/400 |
| 3,570,408 | 3/1971 | Lich | 105/133 |
| 4,079,955 | 3/1978 | Thorpe et al. | 280/492 |
| 4,086,974 | 5/1978 | Lecleve | 180/9.5 |
| 4,249,629 | 2/1981 | Hutt | 280/400 |
| 4,457,099 | 7/1984 | Kozuka et al. | 446/437 |
| 4,630,991 | 12/1986 | Landoll et al. | 414/478 |
| 5,011,362 | 4/1991 | Pijanowski | 414/480 |
| 5,035,462 | 7/1991 | Page et al. | 414/495 |
| 5,263,807 | 11/1993 | Pijanowski | 414/480 |
| 5,280,940 | 1/1994 | Kendall | 280/492 |
| 5,468,007 | 11/1995 | Kanerva | 280/492 |
| 5,490,684 | 2/1996 | Chapman | 280/400 |

FOREIGN PATENT DOCUMENTS

| | | | |
|---|---|---|---|
| 2663590 | 12/1991 | France | 280/400 |
| 2087329 | 5/1982 | United Kingdom | 280/400 |

*Primary Examiner*—Karen M. Young
*Assistant Examiner*—R. B. Johnson

[57] ABSTRACT

A vehicle chassis having a front section and a rear section pivotably joined together at their common ends to allow the two chassis to pivot or swivel providing better traction for off-road travel. Limiting structure is provided to limit the amount of degrees the two chassis can swivel in relation to each other as well as locking structure between them for on road travel.

6 Claims, 2 Drawing Sheets

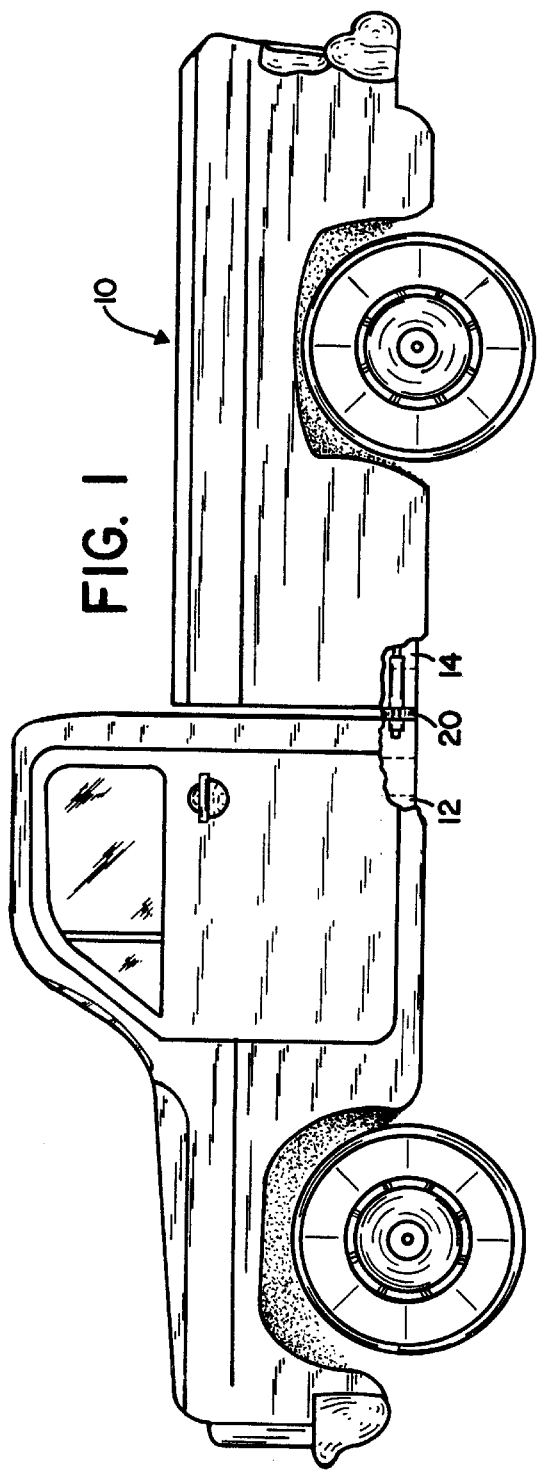
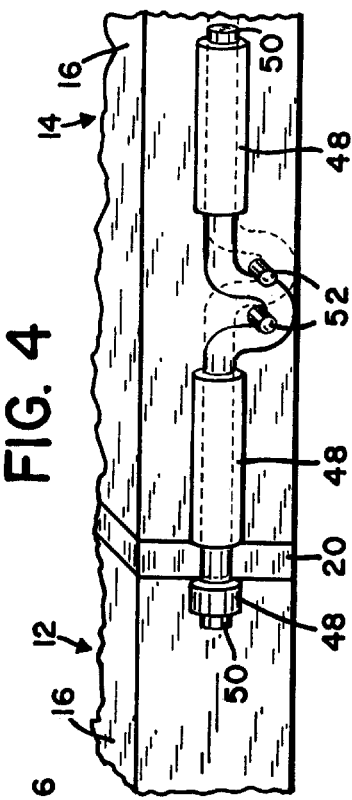
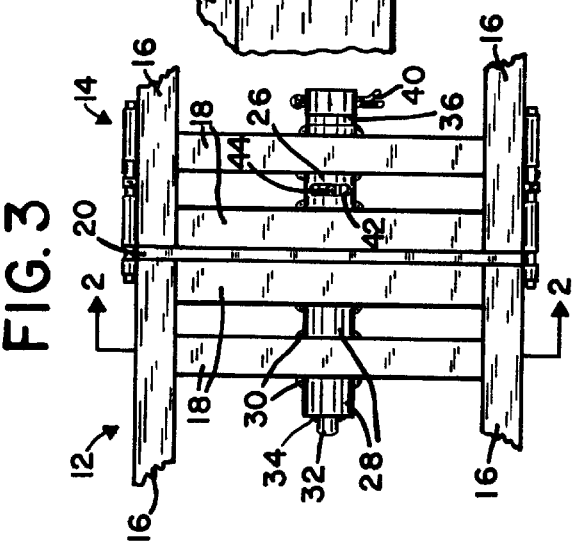
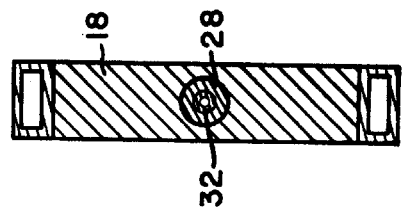

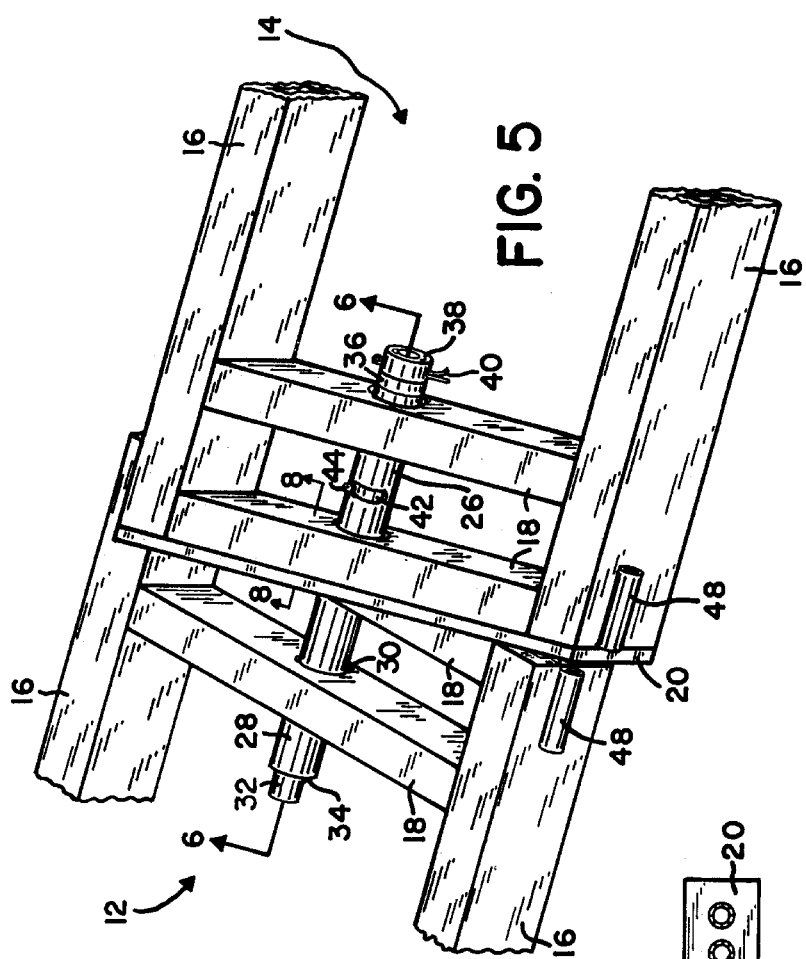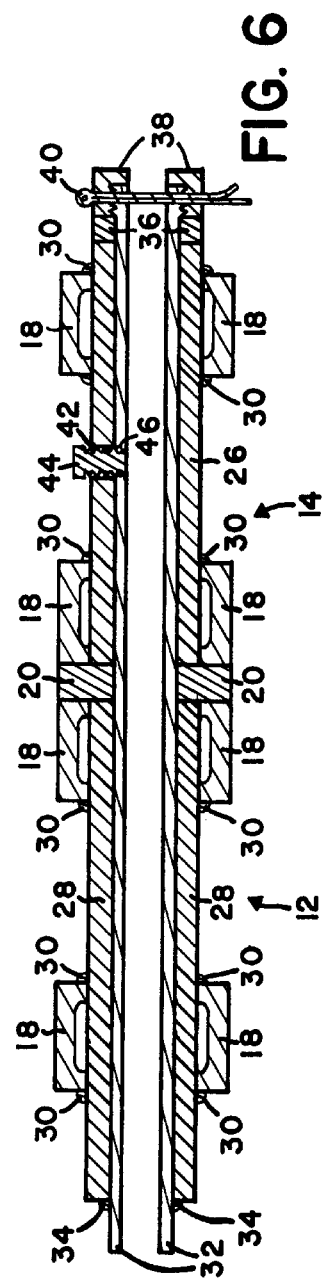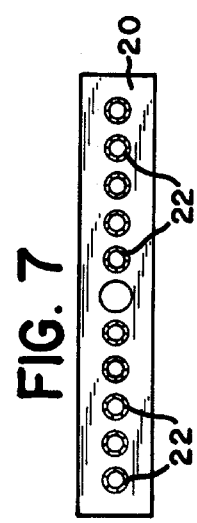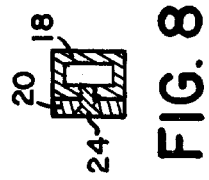

UTILITY VEHICLE HAVING TWO PIVOTABLE CHASSIS

FIELD OF THE INVENTION

This invention relates to a chassis for a vehicle and more particularly to a pick-up truck which has two chassis pivoted together to allow the back wheels and the front wheels to follow the contour of the terrain independently.

BACKGROUND OF THE INVENTION

Their has long been a need for vehicles such as a pick-up truck or other vehicles which is designed to follow the terrain with individual suspension of each wheel to allow each wheel to stay in firm contact with the terrain and, especially for off-road vehicles, it becomes important for each wheel to have as many degrees of travel in relation to each other as possible.

Also, a number of attempts have been made to increase the usability of trucks by providing means to allow the chassis to "buckle" near the center in both a horizontal and vertical plane but while somewhat successful for its intended use does not address the problem of "twisting" the chassis to allow the wheels in the back and front to stay in contact with the terrain even under the worse condition.

The U.S. Patent issued to Page, U.S. Pat. No. 5,035,462 teaches a truck with a vertically adjustable bed but does not "twist" in the middle.

The U.S. Patent issued to Landoll, U.S. Pat. No. 4,630,991 teaches a chassis that "buckles" upward for loading and unloading but again does not "twist".

Nowhere in the prior art found by the applicants does it teach a chassis that "twists" or is pivotably connected to allow each axle to act independently to follow the contour of the terrain.

SUMMARY OF THE INVENTION

It is therefore a primary object of the present invention to provide a vehicle with two separate chassis that are pivotably connected at their common end.

A further object is to provide means to limit the degree of travel between the two chassis.

Still another object is to provide means to pivotably connect the two chassis in a manner that will provide pulling and buckling strength.

Yet another object is to provide a channel through substantially the center axis of the pivoting point to allow the passage of wiring and hydraulic lines or the like.

Another object is to provide a friction plate between the two chassis to facilitate wear.

Another important object is to provide locking means between the two chassis to provide conventional handling.

Still another object is to provide means to removably detach one chassis from the other for repair.

BRIEF DESCRIPTION OF THE DRAWINGS

FIG. 1 a side view of a truck having a partial cut-a-way.

FIG. 2 is a sectional view taken at 2—2 of FIG. 3.

FIG. 3 is a partial top view of the vehicle chassis.

FIG. 4 is a plan view of the preferred embodiment for a locking mechanism used for removably attaching two chassis together.

FIG. 5 is a perspective view of the chassis in an unlocked twisted position.

FIG. 6 is a sectional view taken at 6—6 of FIG. 5.

FIG. 7 is a substantially a front view of a friction plate.

FIG. 8 is a sectional view taken at 8—8 of FIG. 5.

DETAILED DESCRIPTION OF THE DRAWINGS

Referring now in detail to the drawings wherein like characters refer to like elements throughout the various drawings, in FIG. 1, arrow (10) represents an overview of a vehicle having chassis 12 and 14 respectively.

Referring now to FIGS. 3, 5 and 6, wherein chassis 12 and 14 consisting of parallel outside rails 16 and cross members 18 which may be fabricated of metal and welded together to form an independently constructed front chassis 12 and an independently constructed rear chassis 14, a friction plate 20 (clearly shown within FIGS. 7 and 8) is secured to one of the chassis (shown in the preferred embodiment as being secured to chassis 14) by counter sunk bolts 24 through counter sunk holes 22. The friction plate 20 may be made of high impact plastic or other suitable material of choice to provide a surface which is as frictionless as possible.

The two chassis 12 and 14, respectively, are secured together in a manner, and by means which allows them to "swivel" or "pivot" in relation to each other and in the preferred embodiment consists of a metal pipe section 26 in chassis 14 and a pipe section 28 in chassis 12 being welded into place such as by multiple welds 30, respectively, with a longer pipe 32 connecting the two chassis 12 and 14 together by being inserted into the pipes 28 and 26 respectively, with pipe 32 being welded to pipe 28 on one of its ends, as shown by numeral 34 and a retaining means is provided, such as washer 36 and a threaded end cap 38 with cotter key 40 on its other end.

42 is a slot in pipe 26 to allow a bolt or pin 44 to be secured into the pipe 32 such as by threads 46, while 48 are pipes affixed to side rails 14 and 16 by means such as welding to allow a bolt or pin (not shown) to be inserted when the two chassis are in an aligned position, while the preferred embodiment for locking the two chassis together is depicted in FIG. 4, drawn to a different scale, which shows a slider 50 instead of a bolt or pin, with the slider 50 having a first and second position, with the first position shown in solid lines and the second position shown in ghost lines being retained in each position by protruding pins 52 which are suitably affixed to the chassis 14.

MODE OF OPERATION

The apparatus of the present invention may be built into the vehicle at the time of manufacture or it may be installed after market from a kit provided by a manufacturer.

When the invention is installed and both chassis 12 and 14 are locked together in a first position by two side bolts or by pins 50 through pipes 48, the vehicle operates in a normal on-road manner with the two chassis performing as one, however, whenever the bolts are removed, or pins 50 are engaged in their second, unlocked positions, the two chassis 12 and 14 can swivel in relation to each other for off-road use. The slot 42 allows the bolt or pin 44 to limit the travel of chassis 14 in relation to chassis 12 and the prototype allowed the chassis to swivel as much as 30 degrees but no limit is to be implied as to the amount of degrees which might be possible. The ability of the chassis to swivel in such a manner makes it possible to traverse terrain here-to-fore un-traversable.

Pipe 32 may also act as a channel through which electrical lines or brake lines may be housed, as the center hole or pipe 32 is on the rotation axis of both chassis.

The term "vehicle" is not to be limited to the preferred embodiment shown in the drawings as a "pick-up" truck but this invention applies to any land vehicle such as large road equipment, tractors, trailers, trucks of all descriptions, padding machines for pipe lines, digging equipment, snowmobiles, three wheel vehicles, horse drawn vehicles such as wagons, etc.

It will now be seen that we have herein provided a new vehicle chassis which includes a front and a rear chassis and means to pivotably join the front chassis to the rear chassis at their common end when the front chassis and the rear chassis are laid end to end.

It will also be seen that we have herein provided a front chassis and a rear chassis which have a first and a second position in relation to each other, with the first position forming a common plane and the second position forming an uncommon plane.

It will further be seen that we have herein provided a vehicle chassis which includes means to limit the degree of travel between the two interconnected chassis.

It will also be seen that we have herein provided a vehicle chassis which includes means to pivotably connect the two chassis in a manner that will provide pulling and buckling strength.

It will still further be seen that we have herein provided a vehicle chassis which includes a channel through substantially the center rotating axis of the pivoting point to allow the passage and installation of wiring and hydraulic lines, or the like.

It will also be seen that we have herein provided a vehicle chassis which includes a friction plate between the two chassis to facilitate wear.

It will still further be seen that we have herein provided a vehicle chassis which includes locking means between the two chassis to provide conventional handling.

It will further be seen that we have herein provided a vehicle chassis which allows the chassis to be detached from each other so as to allow for easy repair.

Although the invention has been shown and described in what is conceived to be the most practical and preferred embodiment it is recognized that departures may be made therefrom within the scope and spirit of the invention, which is not to be limited to the details disclosed herein but is to be accorded the full scope of the claims so as to embrace any and all equivalent devices and or apparatus's.

Having described our invention, what we claim as new and desire to secure by LETTERS PATENT is:

1. A vehicle comprising: an independent front chassis, an independent rear chassis, the chassises having common ends when said front chassis and said rear chassis are placed adjacent to each other in an end to end manner, said front chassis and said rear chassis having first and second pivotal positions relative to each other, means for pivotably joining said front chassis to said rear chassis including:

a. first and second pipe sections located along a common axis and at said common ends of said front and rear chassis, b. a third pipe section having a first and second end and of a length and size to fit into both said first and second pipe sections, c. said third pipe being secured at its said first end to said first pipe section, d. said third pipe being free to turn within said second pipe section, e. and means to retain said third pipe at its said second end to said second pipe section;

friction plate means, said plate means being operatively connected to one of said common ends of said front or said rear chassis; and locking means to lock said first and said second chassis together to prevent pivotal movement about said common axis.

2. The vehicle of claim 1 in which said means to retain said third pipe at its said second end to said second pipe section is a washer, nut and cotter-key.

3. The vehicle of claim 1 in which said vehicle is a truck.

4. The vehicle of claim 1 in which said locking means are bolts.

5. The vehicle of claim 1 in which said locking means are pins, said pins having a locked position and an un-locked position.

6. The vehicle of claim 1 including means to limit the degree of travel between said front chassis and said rear chassis along said axis when forming said common ends.

* * * * *